United States Patent [19]

Peetz et al.

[11] Patent Number: 4,594,033
[45] Date of Patent: Jun. 10, 1986

[54] BORING TOOL FOR PRODUCING UNDERCUTS IN HOLES

[75] Inventors: Wolfgang Peetz, Blitzenreute; Siegfried Klaissle, Schlier/Unterankenreute; Bernhard Moser, Altshausen; Norbert Müller, Wolpertwende, all of Fed. Rep. of Germany

[73] Assignee: Hawera Probst GmbH & Co., Ravensburg, Fed. Rep. of Germany

[21] Appl. No.: 634,874

[22] Filed: Jul. 26, 1984

[30] Foreign Application Priority Data

Jul. 29, 1983 [DE] Fed. Rep. of Germany ....... 3327409

[51] Int. Cl.$^4$ ............................................. B27G 15/02
[52] U.S. Cl. ................................... 408/156; 408/153; 408/158; 408/180
[58] Field of Search ............... 408/153, 154, 156, 158, 408/159, 160, 169, 170, 173, 180, 58, 206, 223, 714; 409/181; 144/85

[56] References Cited

U.S. PATENT DOCUMENTS

| 2,236,944 | 4/1941 | Gerardi | 408/159 |
| 2,541,537 | 2/1951 | Newcomb | 408/158 |
| 2,628,513 | 2/1953 | Packard | 408/714 |
| 3,261,236 | 7/1966 | Flannery | 408/714 |
| 3,412,733 | 11/1968 | Ross | 408/223 |
| 4,361,957 | 12/1982 | Krotz et al. | 408/58 |
| 4,411,324 | 10/1983 | Liebig | 408/159 |

FOREIGN PATENT DOCUMENTS 579744  7/1959  Canada ........................ 409/181

Primary Examiner—Donald R. Schran
Assistant Examiner—James L. Wolfe
Attorney, Agent, or Firm—Becker & Becker, Inc.

[57] ABSTRACT

A boring tool for producing undercuts in preformed holes. The boring tool has a cutting element which is provided at one end of a driving shaft. In order to produce the undercut, the driving shaft can be deflected at right angles to the axis thereof via a deflection mechanism. The deflection mechanism is accommodated in the boring tool, and is provided with a longitudinally displaceable deflection rod for positively deflecting the driving shaft. In the deflected position, the driving shaft is driven by a rotary drive which is separate from the turning drive. As a result, the undercuts can be very precisely produced.

20 Claims, 7 Drawing Figures

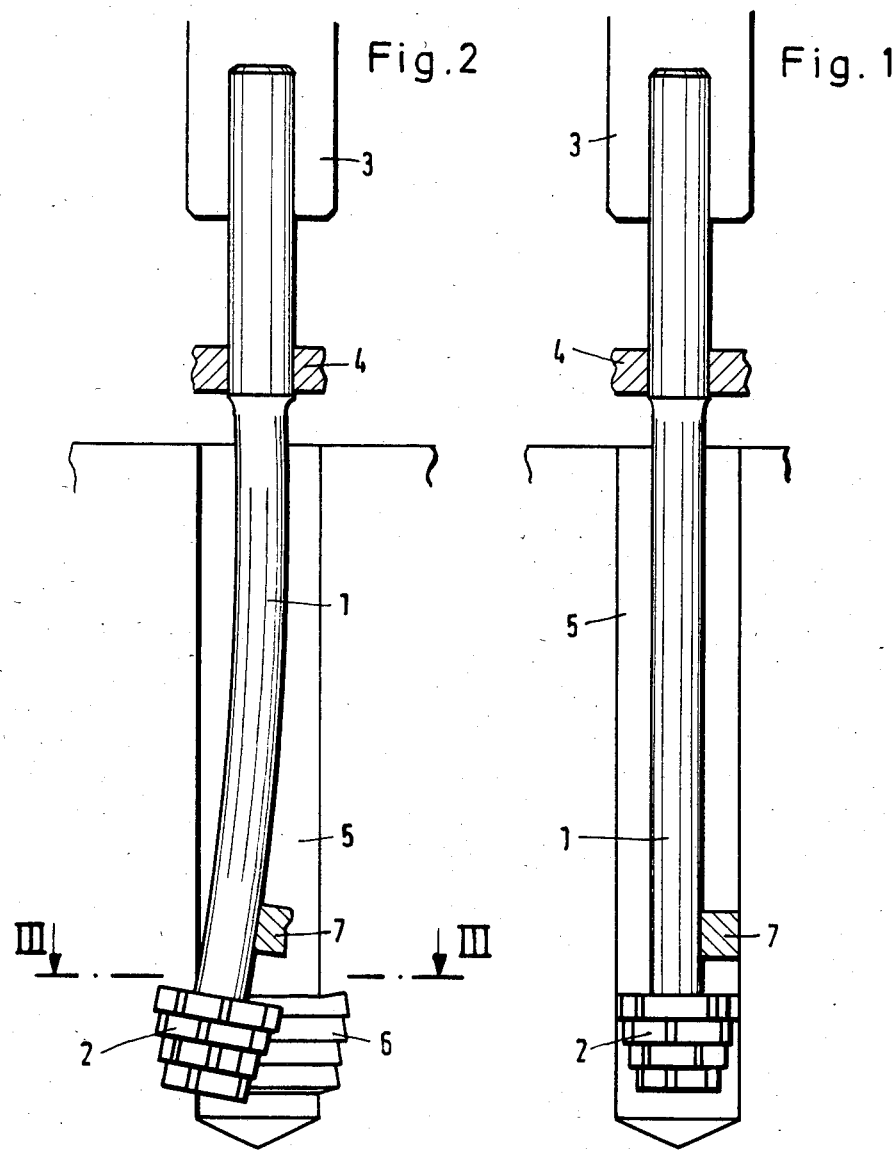

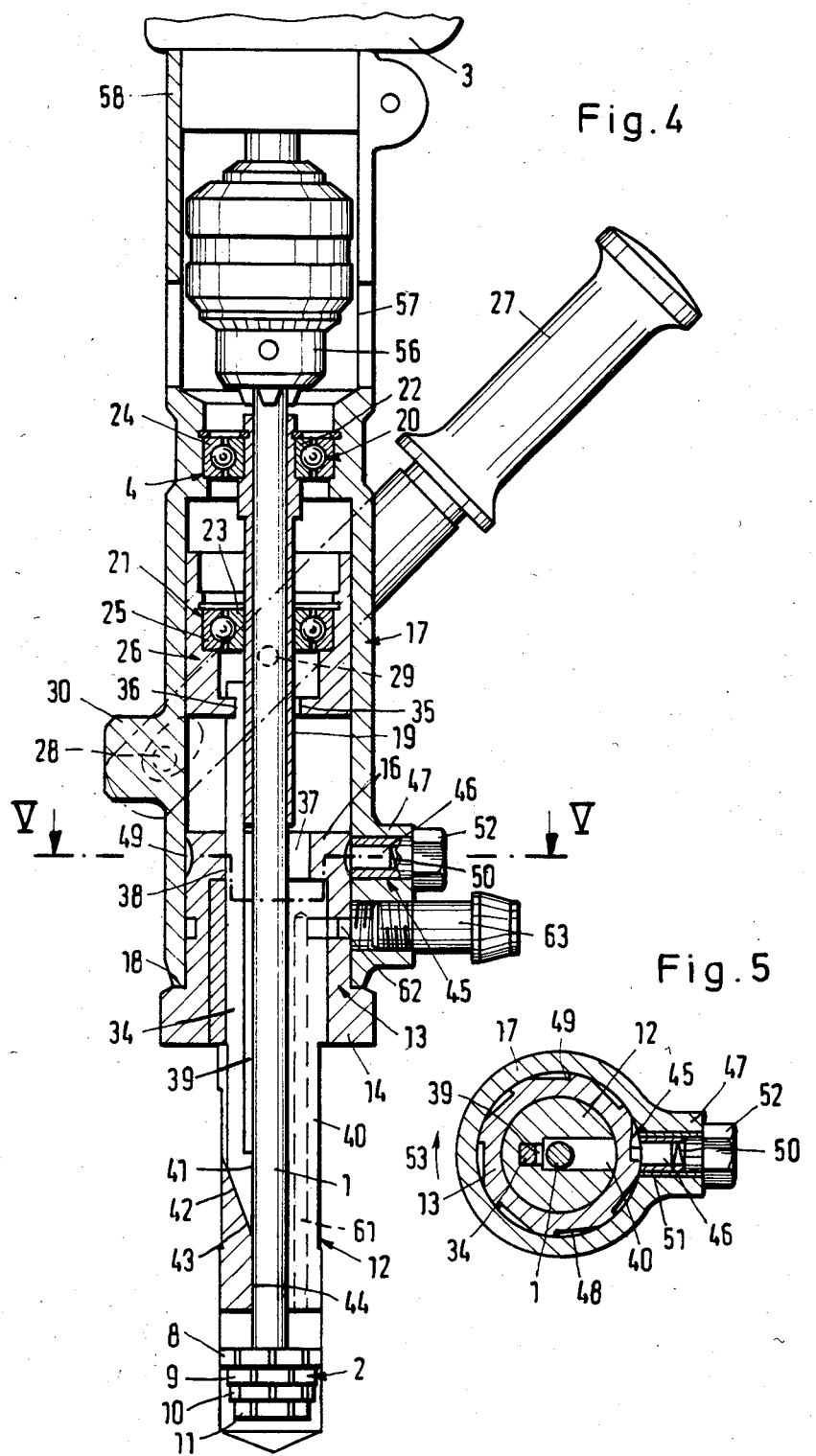

BORING TOOL FOR PRODUCING UNDERCUTS IN HOLES

BACKGROUND OF THE INVENTION

FIELD OF THE INVENTION

The present invention relates to a boring tool for producing back tapers or undercuts in holes, especially in preformed holes. The boring tool has a cutting element which is provided on one end of a driving shaft, the other end of which is adapted to be connected to a turning drive. The driving shaft, at least in the vicinity of the cutting element, can be deflected at substantially right angles to the axis thereof.

With such a boring tool, preformed, cylindrical holes are provided with undercuts for positive anchoring of mounting elements, such as expanding dowels. The driving shaft is resiliently bendable spring steel and, via a fastening cone, is clamped into the receiving means of a drill which rotatably drives the driving shaft. To produce the undercut, the driving shaft is bent out of the axis of the cylindrical bore by the drill during the drilling process, and at the same time is pivoted about the mouth of the hole in the manner of a stirring movement. In so doing, the driving shaft is resiliently bent, as a result of which the cutting element drills the undercut in the hole. However, with the heretofore known boring tool of this general type, no clean undercuts can be produced in the hole because the entire drill must be manually moved in a circle in order to produce the undercut. With this heretofore known device, the driving shaft is supported against the edge of the hole during the circular movement, as a result of which, especially when the hole is in soft material, the driving shaft can break out, whereupon a true running is no longer assured.

An object of the present invention is to improve a boring tool of the aforementioned general type in such a way that the undercut in the preformed hole can be precisely produced without a circular movement of the turning device, and can be produced independent of the latter even in soft material.

BRIEF DESCRIPTION OF THE DRAWINGS

This object, and other objects and advantages of the present invention, will appear more clearly from the following specification in conjunction with the accompanying drawings, in which:

FIG. 1 schematically illustrates one inventive embodiment of a boring tool with the driving shaft in the starting position;

FIG. 2 shows the boring tool of FIG. 1 with the driving shaft deflected for producing an undercut in a preformed hole;

FIG. 3 is a cross sectional view taken along the line III—III in FIG. 2;

FIG. 4 is an axial cross-sectional view through one embodiment of the inventive boring tool;

FIG. 5 is a cross-sectional view taken along the line V—V in FIG. 4;

SUMMARY OF THE INVENTION

Figure 6:
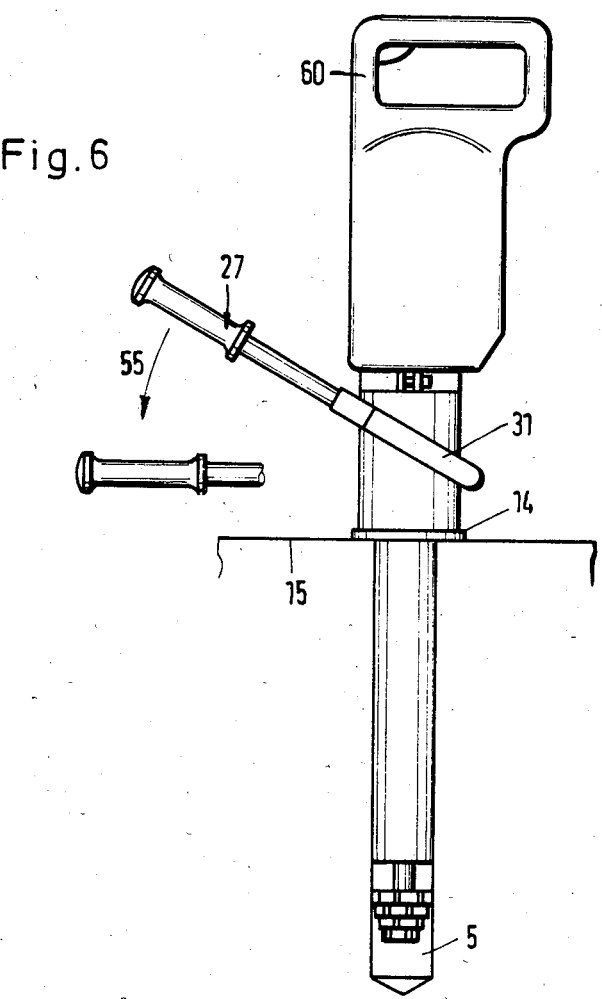
FIG. 6 schematically illustrates the inventive boring tool connected to a drill, with the boring tool having a handle for deflecting the driving shaft.

The boring tool of the present invention is characterized primarily in that a deflection mechanism having an axially or longitudinally displaceable deflection rod is accommodated in the boring tool; the deflected position of the driving shaft is positively adjustable with the deflection rod; furthermore, the driving shaft is coupled with a rotary drive which is separate from the turning drive, and with which the driving shaft is rotatably driven in the deflected position, during the rotation thereof by the turning drive, for producing the undercut.

With the inventive boring tool, the turning drive, for example a drill, is not moved in a circle during the production of the undercut, so that the deflected driving shaft can be very precisely guided in the preformed hole. As a result, very exact undercuts can be produced in which the mounting elements, such as spreading dowels and the like, can be reliably held. Since the rotary drive for the driving shaft and the cutting element is separate from the turning drive, the driving shaft, and hence the cutting element, can be very precisely moved in a circular manner, so that a control of the rotary movement of the cutting element is provided at any given time. The driving shaft with the cutting element can be very precisely deflected by means of the deflection rod, because as a result of the positive adjustment, the driving shaft can be very precisely placed in a specific position. The deflection rod is accommodated in the boring tool in a protected manner.

Pursuant to further features of the present invention, the rotary drive can be operated manually, for example with a handle which is connected to a housing of the boring tool and which is drivingly connected with a driving element of the rotary drive.

The rotary drive may be a ratchet and pawl arrangement, and the driving element may be the housing, in which is mounted at least one driving member which meshes with a ratchet wheel that is drivingly connected with the driving shaft. The ratchet wheel may be a part of a sleeve which is rigidly connected with a guide member for the driving shaft. The driving member may be spring-loaded in the direction toward the engagement position thereof. The guide member may be sleeve-like, may support the boring tool in the preformed hole, and may be provided with at least one axially extending slot or groove for the deflection movement of the driving shaft. At least one withdrawal bore may be provided in the guide member. This withdrawal bore may open in the immediate vicinity of the cutting element, and may lead to a vacuum connection.

The deflection mechanism can be manually operated, for example via the handle. The driving shaft can be arrested in the deflected position. The deflection rod may be a resiliently bendable rod which engages the driving shaft. The deflection rod may have at least one wedge surface with which is associated a wedge counter surface, for example on the guide member. The deflection rod may be axially displaceable within the guide member. The deflection rod may project beyond the guide member, and may be provided with a shifting part on that end which sticks out. The shifting part may be displaceable in the housing via the handle. That end of the driving shaft which projects beyond the guide member may be guided in a further sleeve.

DESCRIPTION OF PREFERRED EMBODIMENTS

Referring now to the drawings in detail, the illustrated drill bit or boring tool serves for the production of back tapers or undercuts in cylindrical holes in concrete or similar materials for positively anchoring dowels or similar mounting elements. The boring tooling has a driving shaft 1, the free end of which is rigidly connected with a cutting element 2. The other end of the driving shaft 1 is clamped into a driving machine 3; the machine 3 can be a drill with which the driving shaft 1 is rotatably driven. In the vicinity of the driving machine 3, the driving shaft 1 is radially supported by a bearing or support 4.

In the starting position (FIG. 1), the cutting element 2 and the driving shaft 1 of the boring tool are placed in a hole 5. The hole 5 can be a preformed hole, or, with appropriate construction of the cutting element 2, can be produced by the latter during advance of the boring tool. To produce a back taper or undercut 6 in the hole 5, the driving shaft 1 is deflected substantially at right angles to the axis thereof via a deflection mechanism 7 which engages the driving shaft 1 near the cutting element 2. As a result, the cutting element 2 is displaced by the distance "a" (FIG. 3). This distance determines the depth of the undercut 6. The deflection mechanism 7 is arrested in the deflected position, and the cutting element 2 is rotatably driven about the center line "b" (FIG. 3). The undercut 6 is effected after one rotation. The driving shaft 1 is designed in such a way that the deflection thereof takes place in the elastic range, and that after release of the deflection mechanism 7, again springs back into the starting position thereof as shown in FIG. 1. However, the driving shaft 1 also can be designed in such a way that thereof is provided in the region between the bearing 4 and the cutting element 2 with a joint about which the driving shaft is pivoted during deflection.

A preferred inventive embodiment of a boring tool is illustrated in FIGS. 4 and 5. The driving shaft 1 is rigidly connected to the cutting element 2, and as a part which is subject to wear, can be completely and easily replaced. By special design of the cutting element 2, various undercut shapes can be realized. In the illustrated embodiment, the cutting element 2 is preferably composed of individual milling-cutter disks 8–11 of hard alloy or metal. In order to achieve an optimum adaptation to the respective application, adjacent milling-cutter disks can be staggered relative to one another.

The driving shaft 1 projects downwardly out of a guide member 12 which guides the boring tool in the hole 5. The outer dimensions of the guide member 12 correspond to the inner dimensions of the hole 5, so that the guide member 12 contacts the wall of the hole 5 and provides a reliable guidance for the boring tool during production of the undercut. The upper end of the cylindrical guide member 12 extends into a sleeve 13, that end of which which faces the cutting element 2 is provided with a flange 14 with which the boring tool is supported, during drilling, on the foundation, etc. 15 which contains the hole 5 (FIG. 6). The guide member 12 is non-rotatably seated in the sleeve 13, that end of which is disposed opposite the flange 14 is provided with an inwardly directed flange 16 against which the end face of the guide member 12 rests.

The sleeve 13 in turn is rotatably accommodated in a tubular housing 17 of the boring tool. The end 18 of the housing 17 rests on the flange 14 of the sleeve 13. The sleeve 13 is axially secured within the housing 17 in a suitable manner.

As shown in FIG. 4, the driving shaft 1 projects beyond the sleeve 13, and is surrounded and guided in the region above the sleeve 13 by a sleeve 19 which is axially secured in the housing 17. The sleeve 19 ends at a slight distance from the flange 16 of the sleeve 13.

Figure 7:
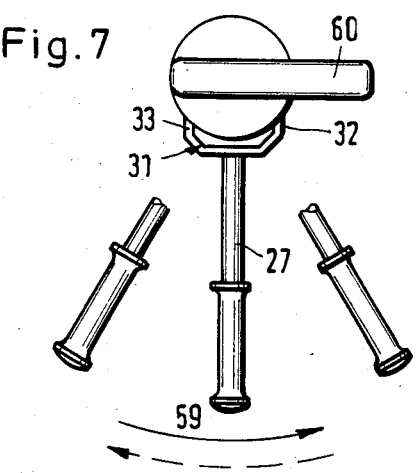
FIG. 7 is a plan view of the arrangement of FIG. 6 showing different positions of the handle for producing the rotary movement of the deflected driving shaft.

The bearing 4 of the driving shaft 1 is provided with two axially spaced apart ball bearings 20 and 21, the inner rings 22, 23 of which are seated upon the sleeve 19. The outer ring 24 of the axially upper ball bearing 20 is mounted and axially secured on the inner side of the housing 17. The outer ring 25 of the axially lower ball bearing 21 is mounted on the inner side of a sleeve-like shifting part 26 which is axially displaceably guided along the inner wall of the housing 17; the shifing part 26 surrounds the sleeve 19 with the driving shaft 1 with play. A handle 27 is provided for axially displacing the shifting part 26. The handle 27 is pivotably connected to the housing 17 about a a shaft 28. The handle 27 is furthermore connected with the shifting part 26 by means of a link pin 29. By pivoting the handle 27, the shifting part 26 can be axially displaced in the housing 17 by means of the link pin 29. The link pin 29 is disposed on the handle 27 in such a way that despite the pivot movement of the handle, axial displacement of the shifting part 26 is possible. In the deflection region of the handle 27, the housing 17 is provided with a radially outwardly projecting shoulder 30 which can easily accommodate the shaft 28. As shown in FIG. 7, the free end of the handle 27 can be provided with a fork-shaped piece 31, the legs 32, 33 of which embrace the housing 17 at diametrically opposed locations. With such a design of the handle, two link pins 29 are provided at diametrically opposed locations of the housing 17 or of the shifting part 26; each one of these link pins 29 engages one of the two legs 32, 33. Since during axial displacement of the shifting part 26, the link pin or pins 29 are also displaced in the axial direction; the housing 17 is provided with a slot of appropriate length.

The shifting part 26 serves to axially displace a deflection rod 34, one end of which is connected with the shifting part 26. That end of the collar-like shifting part 26 which faces the sleeve 13 is provided with a radially inwardly directed flange 35, which is spaced from the sleeve 19 and which properly extends into a recess 36 of the deflection rod 34. In the vicinity of the sleeve 19, the deflection rod 34 rests thereagainst. From there, the deflection rod 34 extends through the opening 37 defined by the flange 16 of the sleeve 13, and rests against the inner end face 38 of this flange 16. When viewed in the axial direction, the radial distance between this inner side 38 of the flange 16 and the outer side of the sleeve 19 thus corresponds to the radial width of the deflection rod 34. In order for the deflection rod 34 to retain the precise position thereof relative to the driving shaft 1, the deflection rod 34 has an angular cross section (FIG. 5) and is guided in an axially extending groove 39 in the guide member 12; in the central portion thereof, this groove 39 is open radially outwardly (FIG. 4). When viewed at right angles to the axial direction of the guide member 12, the groove 39 is constructed in such a way that the opposite side surfaces of the deflection rod 34 rests against the walls of the groove. Furthermore, in the upper region the deflection rod 34 rests against the bottom of the groove 39, so that the rod 34 is reliably guided within the guide member 12. For longer guide members 12, thereof is advantageous for the groove 39 to be provided with a bottom over the entire length thereof, so that the correspondingly long deflection rod 34 is reliably supported. In the radial direction, the groove 39 opens out into a groove 40 which has a greater width, which extends to the outer side of the guide member 12, and through which the driving shaft 1 extends. The width of the groove 40 corresponds to the diameter of the driving shaft 1, so that the latter is secured against transverse displacement.

In the region beyond the sleeve 19, the deflection rod 34 extends at a slight radial spacing from the driving shaft 1. The width of the free end of the deflection rod 34 is increased, and is provided not only with an axially extending contact surface 41 which rests against the driving shaft 1, but also a wedge surface 42 which is connected to the contact surface 41 at an acute angle thereto. The wedge surface 42 of the deflection rod 34 rests against a wedge counter surface 43 of the guide member 12. The wedge counter surface 43 is formed by an appropriate widened portion on the inner side of the guide member 12 near the free end thereof. The wedge counter surface 43 merges into a contact surface 44 which is directly adjacent to the contact surface 41 of the deflection rod 34, and forms a continuous extension thereof. The contact surface 44 extends to the end face of the guide member 12, so that the driving shaft 1 is supported in this region over a relatively great axial length by the contact surfaces 41 and 44. In the end portion of the guide member 12, the contact surface 44 forms the bottom of the groove 40. Thus, as shown in FIG. 5, the driving shaft 1 is secured against displacement transverse to the axial direction not only by the contact surfaces 41 and 44, but also by the side walls of the groove 40. The driving shaft 1 can be moved only within the groove 40 in a direction predetermined by the radial extension of the groove 40; this will be subsequently explained in greater detail.

The wedge counter surface 43 forms a further support for the deflection rod 34 in the end region thereof, so that the deflection rod 34 is satisfactorily guided over its entire length.

The handle 27 serves not only for axial displacement of the shifting part 26 and the deflection rod 34, but also for rotational drive of the driving shaft 1 when the latter is radially deflected by the deflection rod 34 in a manner which will be described subsequently. The rotary drive 45 can be manually operated with the handle 27. The advantage to this is that the rotation of the cutting element 2 can be carried out in a controlled manner. As a result, the undercut 6 can be produced very precisely in the hole 5. Furthermore, the rotary drive 45 can be operated very simply with the handle 27, so that handling of the boring tool is very easy. The handle 27 is drivingly connected with a driving element of the rotary drive 45, so that by appropriate actuation of the handle, the rotary drive can be operated by simple pivot movements. The driving element is preferably the housing 17, which is rotatably mounted on the sleeve 13. In order to transfer the rotational movement of the housing 17 to the driving shaft 1, and hence to the cutting element 2, a driving member 46 is mounted in the housing. The driving member 46 meshes with a ratchet wheel 48 which is drivingly connected with the driving shaft 1. The driving member 46 is accommodated in a radially extending projection 47 of the housing 17. For manufacturing reasons, the ratchet wheel 48 is preferably a part of the sleeve 13. The sleeve 13, at the level of the flange 16, and along the outer periphery, is provided with detents 49 with which the driving member 46 meshes.

The driving member 46 is under the influence of a spring 50 which urges the driving member 46 in the direction of the engagement position thereof. As a result, the driving connection between the housing 17 and the sleeve 13 is assured at all times. A bolt 52 is placed in the bore 51 of the projection 47, in which bore 51 the driving member 46 is disposed in such a way as to be radially displaceable; the pretension of the compression spring 50 is preferably adjustable by means of the bolt 52.

The housing 17 with the driving member 46 and the ratchet wheel 48 form the rotary drive 45 of the boring tool, which is designed as a free-running drive yet preferably as a ratchet and pawl. The sleeve 13 can be turned in the direction of rotation 53 (FIG. 5) by means of the rotary drive 45.

To produce the undercut 6 in the hole 5, the boring tool is placed in the hole in the position illustrated in FIGS. 1, 4, and 6. The guide member 12 supports the boring tool in the hole 5, so that the boring tool is precisely aligned within the hole. The handle 27 is subsequently pivoted downwardly about the shaft 28 in the direction of the arrow 55 (FIG. 6). In so doing, the shifting part 26 is displaced downwardly in the housing 17. As a result, the deflection rod 34 which is connected to the shifting part 26 also is displaced downwardly. Since the wedge surface 42 of the deflection rod 34 rests upon the wedge counter surface 43 of the guide member 12, during the aforementioned axial displacement the deflection rod 34 is deflected by means of these wedge surfaces at substantially right angles to the driving shaft 1. For this purpose, the deflection rod 34 is expediently bendably resilient. Since the deflection rod 34 is supported against the inner side 38 of the flange 16 as well as along the bottom of the groove 39 in the guide member 12, and is supported against the driving shaft 1 via the contact surface 41, a buckling or sharp bending of the deflection rod 34 is reliably prevented during the axial displacement via the handle 27. During axial displacement of the deflection rod 34, the driving shaft 1 also is radially deflected within the groove 40 in the guide member 12, as schematically illustrated in FIG. 2. The shifting part 26 with the deflection rod 34 forms the deflection mechanism 7, with which the driving shaft 1 can be radially deflected to the desired extent. The axial displacement of the deflection rod 34 can be carried out during rotation of the driving shaft 1, so that the cutting element 2 already begins to drill the undercut 6 in the wall of the hole 5 at the start of the deflection process. As the axial displacement increases, the driving shaft 1 is deflected further until the degree of deflection corresponds to the desired depth of the undercut 6. Since the deflection mechanism 7 can be operated manually by means of the handle 27, the angle of deflection of the driving shaft 1 can be adjusted very precisely and easily, so that the depth of the undercut 6 can be precisely set in a simple manner. For this purpose, markings can be placed on the outside of the housing 17 for indicating the degree of deflection of the driving shaft 1 and hence the depth of the undercut 6.

The contact surface 41 of the deflection rod 34 is curved in conformity to the radius of the driving shaft 1, so that during rotation the latter is supported on this contact surface. During the deflection process thereof, the driving shaft 1 is guided along the side walls of the groove 40, so that the driving shaft 1 also can precisely positioned relative to the guide member 12 in the deflected position. The deflection mechanism 7 is structurally very straight forward, since for deflection of the deflection rod 34 only the wedge surfaces 42 and 43 are required; in other words, no additional structural parts are necessary. The bendably resilient construction of the deflection rod 34 has the advantage that the deflection rod 34 can automatically spring back into the starting position thereof (illustrated in FIG. 4) when the handle 27 is pivoted back. Since the wedge surface 42 of the deflection rod 34 is continuously supported on the wedge counter surface 43 during the axial displacement, the deflection rod 34, despite the bendably resilient construction thereof, can absorb the springback force which results from the driving shaft 1 due to the resilient deflection thereof without thereby adversely affecting the deflection of the driving shaft.

The handle 27 can be pivoted as far as the end position illustrated in FIG. 6, in which position the driving shaft 1 is maximally deflected. The driving machine 3 serves for rotational drive of the driving shaft 1. For this purpose, the free end of the driving shaft 1 is clamped in the chuck 56 of the driving machine 3. To operate the chuck 56, the housing 17 is provided in this region with openings 57 via which the chuck 56 is accessible. In the vicinity of the chuck 56, the housing 17 is provided with an adapter neck 58 via which the housing 17 can be clamped to the driving machine 3 (see FIG. 4). The driving shaft 1, with the cutting element 2 and the sleeve 19, are rotatably driven by means of the likewise rotatably driven chuck 56. When the handle 27 is pivoted in the direction 55 into the end position, the rotary drive 45 is actuated. For this purpose, the handle 27 is pivoted back and forth in the direction of the arrows 59 in FIG. 7. In one pivot direction the driving member 46, which is accommodated in the projection 47 of the housing 17, drives the sleeve 13 via the detents 49. This drive position of the driving member 46 is illustrated in FIG. 5. Since the guide member 12 is rigidly connected with the sleeve 13, the guide member 12 therefore also is driven in the same direction of rotation. The driving shaft 1, which is in the deflected position, is similarly rotatably driven via the side walls of the groove 40 of the guide member 12. When the handle 27 is pivoted in the opposite direction, the driving member 46 then slides or ratchets over the detents 49, while the sleeve 13, along with the guide member 12 and the driving shaft 1, are stationary. The handle 27 subsequently again is pivoted in the opposite direction, whereby the sleeve 13 again is rotated by the driving member 46. In this manner, by constantly pivoting the handle 27 back and forth, the cutting element 2 is rotatably driven until is has made a complete revolution and the undercut 6 is produced over the entire periphery of the wall of the hole 5. As shown in FIG. 2, this rotational movement is effected about the center line "b" of the boring tool. Depending upon the degree of deflection of the driving shaft 1, and hence of the cutting element 2, the depth of the undercut 6 can be produced to the desired extent. The maximum deflection of the cutting element 2 and of the driving shaft 1 is the distance "a" shown in FIG. 3. Since the cutting element 2 does not have to be rotatably driven by 360° in a single pass, the operator of the boring tool easily can produce the undercut 6 in several stages. With such a method of operation there is possible to produce the undercut very precisely. A marking can be placed on the outside of the housing 17 so that the operator easily can determine whether the cutting element 2 has carried out a rotation of 360°. During the rotation of the cutting element 2, the driving shaft 1 is rotably driven continuously by the driving machine 3.

After the undercut 6 has been completed, there is merely necessary to pivot the handle 27 back into its starting position (illustrated in FIG. 4). In so doing, the driving shaft 1 and the deflection rod 34 automatically spring back into their starting position, as shown in FIG. 4. The boring tool then can be withdrawn from the hole 5.

Since in every displacement position the deflection rod 34 is supported on the wedge counter surface 43 of the guide member 12, the driving shaft 1 is precisely positioned in the deflected position thereof. In the downwardly pivoted end position of the handle 27 (FIG. 6), the cutting element 2 is additionally arrested in the deflected position, so that during production of the undercut 6 no unintentional adjustment of the deflection position can occur. This arresting is achieved due to the fact that the wedge surface 42 is displaced beyond the wedge counter surface 43, so that the outside of the deflection rod 34 rests against the contact surface 44.

Due to the rigid connection between the boring tool and the driving machine 3, a secure two-handed operation of the boring tool is provided via the handle 27 and a handle 60 provided on the driving machine 3 (FIGS. 6 and 7). In conjunction with the stepwise rotational movement of the cutting element 2, a simple and reliable operation with the boring tool thereby is assured.

The cutting element 2, the guide member 12, and the deflection rod 34 are expediently exchangeable, so that the boring tool can be easily converted for producing differently shaped undercuts 6.

So that the concrete or rock dust which is produced in the cutting area can be easily removed from the hole 5, at least one axially extending withdrawal bore 61 is provided in the guide member 12. The bore 61 extends from the free end of the guide member 12 to an annular groove 62 in the sleeve 13, which groove 62 opens into a vacuum connection 63 which is provided in the projection 47 of the housing 17. Since the concrete or rock dust is withdrawn directly behind the cutting element 2, interference is avoided and wear of the movable parts is reduced. This is particularly advantageous when working overhead.

The present invention is, of course, in no way restricted to the specific disclosure of the specification and drawings, but also encompasses any modifications within the scope of the appended claims.

What we claim is:

1. A boring tool for producing undercuts in holes, especially in preformed holes; the boring tool having the improvement therewith which tool comprises:
   a resiliently bendable driving shaft having a longitudinal axis and two ends, one of which is adapted to be connected to a turning drive for rotation about the longitudinal axis;
   a cutting element of the boring tool located at the other end of said driving shaft;
   a housing;
   a deflection mechanism which extends shiftable in a guided manner as to an outwardly open location and at least in part in accommodated in said housing; said deflection mechanism including an axially displaceable deflection element for deflecting said resiliently bendable driving shaft at substantially right angles to a longitudinal axis thereof, at least in the vicinity of said cutting element; said deflection element further being resiliently bendable as adapted to effect positive wedging adjustment of a deflected position of said driving shaft; and a rotary drive which is separate from said turning drive, and to which said resiliently bendable driving shaft is drivingly connected; said driving shaft, during its rotation via said turning drive, also being adapted to be revolved additionally by said rotary drive superimposed thereon, when in a deflected position, specifically to effect said production of an undercut simultaneously therewith.

2. A boring tool in combination according to claim 1, in which said rotary drive is adapted to be operated manually.

3. A boring tool in combination according to claim 1, which includes a handle for operating said rotary drive.

4. A boring tool in combination according to claim 3, in which said rotary drive includes a driving element; and in which said handle is connected to said housing and is drivingly connected to said driving element of said rotary drive.

5. A boring tool in combination according to claim 4, in which said rotary drive is a ratchet and pawl arrangement.

6. A boring tool in combination according to claim 4, which includes a ratchet wheel which is drivingly connected with said driving shaft; in which said driving element of said rotary drive is said housing; and in which at least one driving member is mounted in said housing and meshes with said ratchet wheel.

7. A boring tool in combination according to claim 6, which includes a guide member for said driving shaft; and in which said ratchet wheel is part of a first sleeve which is rigidly connected to said guide member.

8. A boring tool in combination according to claim 7, in which said at least one driving member is spring-loaded in the direction toward its meshing position.

9. A boring tool in combination according to claim 7, in which said guide member is sleeve-like, supports said boring tool in said hole, and is provided with at least one axially extending slot to accommodate deflection movements of said driving shaft.

10. A boring tool in combination according to claim 9, in which said housing includes a vacuum connection, and in which said guide member is provided with at least one withdrawal bore, which leads to said vacuum connection and opens out in the immediate vicinity of said cutting element.

11. A boring tool in combination according to claim 9, in which said deflection mechanism is adapted to be operated manually.

12. A boring tool in combination according to claim 9, in which said driving shaft is adapted to be arrested in a deflected position thereof.

13. A boring tool in combination according to claim 9, in which said deflection mechanism is adapted to be operated by said handle.

14. A boring tool in combination according to claim 9, in which said deflection element of said deflection mechanism is a resiliently bendable deflection rod which engages said driving shaft.

15. A boring tool in combination according to claim 14, in which said deflection rod is provided with at least one wedge surface, which cooperates with a wedge counter surface.

16. A boring tool in combination according to claim 15, in which said wedge counter surface is provided on said guide member.

17. A boring tool in combination according to claim 16, in which said deflection rod is axially displaceable within said guide member.

18. A boring tool in combination according to claim 17, which includes a shifting part which is accommodated in said housing; and in which said deflection rod has an end which projects beyond said guide member and is connected to said shifting part.

19. A boring tool in combination according to claim 18, in which said shifting part is adapted to be displaced in said housing by means of said handle.

20. A boring tool in combination according to claim 19, in which that end of said driving shaft remote from said cutting element projects beyond said guide member and is guided in a second sleeve.

* * * * *